United States Patent
He

(10) Patent No.: US 12,449,989 B2
(45) Date of Patent: Oct. 21, 2025

(54) MEMORY DEFRAGMENTATION METHOD AND APPARATUS, DEVICE, AND STORAGE MEDIUM

(71) Applicant: Tencent Technology (Shenzhen) Company Limited, Shenzhen (CN)

(72) Inventor: Xian He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/797,257

(22) Filed: Aug. 7, 2024

(65) Prior Publication Data

US 2024/0393968 A1 Nov. 28, 2024

Related U.S. Application Data

(63) Continuation of application No. PCT/CN2023/123769, filed on Oct. 10, 2023.

(30) Foreign Application Priority Data

Nov. 23, 2022 (CN) .......................... 202211477941.5

(51) Int. Cl.
*G06F 3/06* (2006.01)
(52) U.S. Cl.
CPC ............ *G06F 3/0631* (2013.01); *G06F 3/061* (2013.01); *G06F 3/0673* (2013.01)
(58) Field of Classification Search
None
See application file for complete search history.

(56) References Cited

U.S. PATENT DOCUMENTS

2020/0409833 A1 12/2020 Cao et al.

FOREIGN PATENT DOCUMENTS

| CN | 106681829 A | * | 5/2017 | ........... G06F 9/5022 |
|---|---|---|---|---|
| CN | 109885255 A | | 6/2019 | |
| CN | 110597797 A | | 12/2019 | |
| CN | 113867925 A | | 12/2021 | |

OTHER PUBLICATIONS

Tencent Technology, ISR, PCT/CN2023/123769, Jan. 4, 2024, 2 pgs.

* cited by examiner

*Primary Examiner* — Brian R Peugh
(74) *Attorney, Agent, or Firm* — Morgan, Lewis & Bockius LLP

(57) ABSTRACT

This application provides a memory defragmentation method performed by a computer device. The method includes: obtaining n idle blocks before a tail idle block in a memory of a graphic processing unit, the tail idle block located at a head of remaining unallocated idle blocks in the memory, and n being a positive integer; obtaining tail non-idle blocks in the memory, the tail non-idle blocks comprising one allocated block or a plurality of continuous allocated blocks immediately before the tail idle block in the memory; determining one or more target idle blocks in the n idle blocks, a size of the target idle block being not less than a size of the allocated blocks among the tail non-idle blocks; migrating data in the tail non-idle blocks to the target idle blocks; and updating the head of remaining unallocated idle blocks in the memory by releasing the tail non-idle blocks.

20 Claims, 8 Drawing Sheets

FIG. 5

MEMORY DEFRAGMENTATION METHOD AND APPARATUS, DEVICE, AND STORAGE MEDIUM

CROSS-REFERENCE TO RELATED APPLICATIONS

This application is a continuation application of PCT Patent Application No. PCT/CN2023/123769, entitled "MEMORY DEFRAGMENTATION METHOD AND APPARATUS, DEVICE, AND STORAGE MEDIUM" filed on Oct. 10, 2023, which claims priority to Chinese Patent Application No. 202211477941.5, entitled "MEMORY DEFRAGMENTATION METHOD AND APPARATUS, DEVICE, AND STORAGE MEDIUM" filed on Nov. 23, 2022, both of which are incorporated herein by reference in their entirety.

FIELD OF THE TECHNOLOGY

This application relates to the field of computer technologies, and in particular, to a memory defragmentation method and apparatus, a device, and a storage medium.

BACKGROUND OF THE DISCLOSURE

During graphics rendering, rendering data related to the graphics rendering is stored in a memory of a graphics processing unit (GPU), which leads to memory fragmentation in the memory of the GPU.

In the related art, a computer device first finds out n idle blocks between a beginning and an end of the memory during memory defragmentation on the GPU. If two of the n idle blocks are not continuous in address, in other words, an allocated block exists between the two idle blocks, and the two idle blocks include a target block having a size not less than a size of the allocated block, the computer device migrates data in the allocated block to the target block, to obtain two adjacent idle blocks. The computer device cyclically performs the foregoing operations until no two adjacent idle blocks can be obtained through defragmentation. Then the computer device merges all of the two adjacent idle blocks to complete memory defragmentation.

SUMMARY

This application provides a memory defragmentation method and apparatus, a device, and a storage medium, which can expand a size of available idle blocks in a memory and fully use the idle blocks in the memory. The technical solutions are as follows:

According to an aspect of this application, a memory defragmentation method is performed by a computer device, and the method including:

obtaining n idle blocks before a tail idle block in a memory of a graphic processing unit (GPU), the tail idle block being located at a head of remaining unallocated idle blocks in the memory, and n being a positive integer;

obtaining tail non-idle blocks in the memory, the tail non-idle blocks comprising one allocated block or a plurality of continuous allocated blocks immediately before the tail idle block in the memory;

determining one or more target idle blocks in the n idle blocks, a size of the target idle block being not less than a size of the allocated blocks among the tail non-idle blocks;

migrating data in the tail non-idle blocks to the target idle block; and updating the head of remaining unallocated idle blocks in the memory by releasing the tail non-idle blocks.

According to an aspect of this application, a computer device is provided, the computer device including a processor and a memory, the memory having at least one program stored therein, the at least one program, when loaded and executed by the processor, causing the computer device to implement the memory defragmentation method described in the above aspect.

According to another aspect of this application, a non-transitory computer-readable storage medium is provided, the non-transitory computer-readable storage medium having at least one program stored therein, the at least one program, when loaded and executed by a processor of a computer device, causing the computer to implement the memory defragmentation method described in the above aspect.

Through the migration of the data in the tail non-idle blocks in the memory to the idle block before the tail idle block, the tail non-idle blocks can be sorted as idle blocks, and form continuous idle blocks with the tail idle block. In this way, a size of available idle blocks in the memory can be expanded, and the idle blocks in the memory can be fully used.

BRIEF DESCRIPTION OF THE DRAWINGS

FIG. 5 is a schematic diagram of a memory according to an exemplary embodiment of this application.

DESCRIPTION OF EMBODIMENTS

To make objectives, technical solutions, and advantages of this application clearer, implementations of this application are further described in detail below with reference to drawings.

First, terms involved in the embodiments of this application are described.

Video memory: It may also be referred to as a frame buffer, a graphics card memory, or a display memory. The video memory is configured to store rendering data processed or to be extracted by a graphics chip (graphics processing unit (GPU)). Similar to a random access memory (RAM) of a computer device, the video memory is a component configured to store to-be-processed graphic information.

Memory fragmentation: It is generally classified into internal fragmentation and external fragmentation. The internal fragmentation is caused when a fixed-size memory partition is used. When a process cannot fully use a fixed memory block allocated to the process, the internal fragmentation occurs. Generally, it is difficult to completely avoid the internal fragmentation. The external fragmentation refers to a situation in which some unallocated continuous memory blocks cannot meet a memory allocation request of any process and cannot be used by the process as a result of an excessively small size. The memory fragmentation actually refers to a situation in which idle blocks in a memory not assigned with a task cannot be fully used as a result of a scheduling problem.

GPU driven rendering: It means that actual rendering is controlled by a GPU, which can provide a finer rendering granularity. For example, rendering culling (to avoid a waste of computing resources as a result of repeated rendering) by a central processing unit (CPU) can occur only at an object level through object bounding. In comparison, further control can be achieved for rendering by a GPU, for example, better granularity control can be achieved at a mesh cluster level by cutting a mesh.

Figure 1:
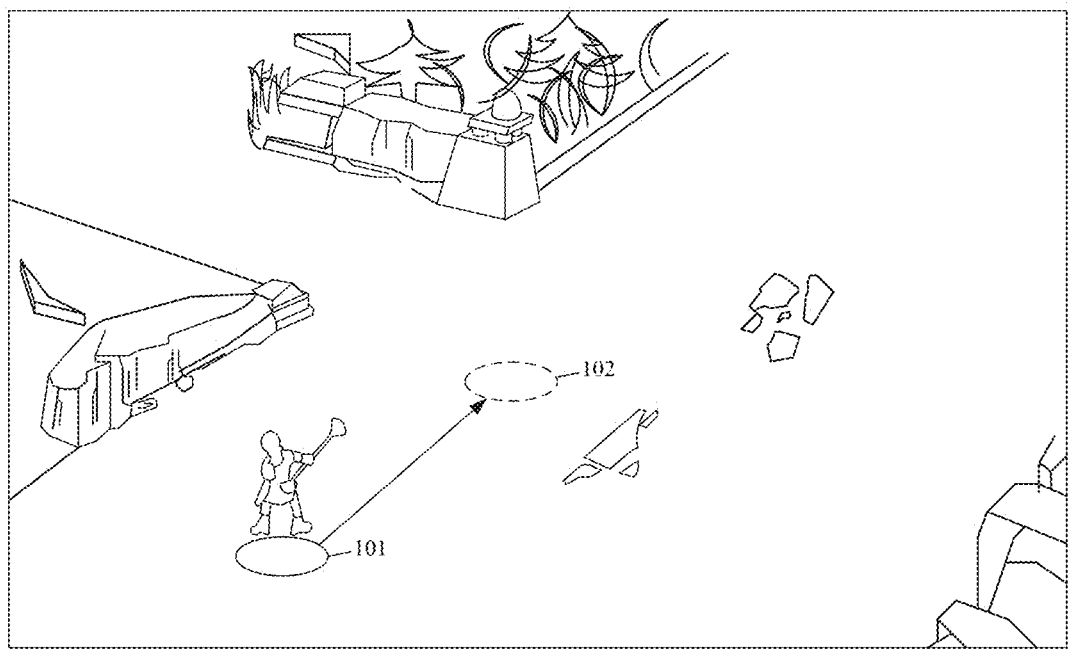
FIG. 1 is a schematic diagram of a game picture according to an exemplary embodiment of this application.

During graphics rendering, memory fragmentation occurs in a memory of the GPU. FIG. 1 is a schematic diagram of a game picture according to an exemplary embodiment of this application. As shown in FIG. 1, when a user controls a virtual character to move from a position 101 to a position 102 in a virtual environment, a displayed game scene may change with the movement of the virtual character. In this process, each frame of the game picture displayed with a change of a game scene triggers loading and unloading of a model. Therefore, many fragments are generated in a video memory of a GPU, which cannot be used, resulting in a waste of the video memory.

A core idea of the GPU driven rendering is to reduce communication between a central processing unit (CPU) and the GPU and assign all rendering-related tasks (including commit) to a GPU side (do things by oneself). A saved computing power of the CPU is configured for constructing rules such as physical and artificial intelligence (AI) rules. In addition, through the computing power of the GPU, generation and merging in a rendering command queue can be controlled at a finer granularity. In this process, a rendering culling operation is mainly performed by the GPU, to obtain final data that needs to be rendered to a picture, thereby avoiding a waste of computing resources caused by repeated rendering. In this process, the GPU completes all occlusion culling calculations, and the CPU may be configured for computations having many branches such as physical or AI computations. During the foregoing GPU driven rendering, a cluster buffer, an index buffer, a position buffer, and the like are used, which are frequently loaded into the video memory of the GPU during game operation. After the virtual character leaves a buffered game scene (for example, a game scene in FIG. 1), a relevant buffer is recycled from the video memory of the GPU. After repeated model loading and unloading, fragmentation occurs in the video memory, which requires memory defragmentation.

In the related art, a computer device calculates a degree of the memory fragmentation, and determines whether a calculated result exceeds a preset threshold. If the calculated result exceeds the threshold, the memory defragmentation is performed, or otherwise, the memory defragmentation is not performed. A memory defragmentation process of the CPU performed by the computer device may be divided into the following operations:

(1) The computer device finds out idle blocks (idle memory segments) between a beginning and an end (a head and a tail) of a memory.

(2) If two of the idle blocks that are found are not continuous in address, in other words, an allocated block exists between the two idle blocks, and the two idle blocks include a block having a size not less than a size of the allocated block, the computer device marks the two idle blocks as two similar idle blocks. If two idle blocks are continuous in address, the computer device marks the two idle blocks as two adjacent idle blocks.

(3) For the two similar idle blocks, the computer device migrates data in the allocated block between the two idle blocks to one of the two idle blocks, so that two adjacent idle blocks can be obtained. Then the computer device marks the two adjacent idle blocks that are newly obtained.

(4) For the blocks marked as the two adjacent idle blocks, the computer device integrates the blocks into a new idle memory block.

(5) The computer device cyclically performs the foregoing operations until no two adjacent idle blocks can be obtained through defragmentation. In this case, the computer device determines that the memory defragmentation is completed.

In the foregoing memory defragmentation solution, many discontinuous idle blocks may still exist in the memory. Since idle blocks can store data separately and cannot store data, if a size of to-be-stored data is greater than a size of an idle block having a largest size, the data cannot be stored. However, actually, the memory still includes other idle blocks that cannot be used. As a result, the idle blocks in the memory cannot be fully used.

The embodiments of this application provide a memory defragmentation method, which is applicable to a memory defragmentation scene of a GPU. For example, the method is applied to a solution based on a GPU driven rendering scene (which is also referred to as a GPU driven scene). The method provided in the embodiments of this application is further applicable to memory defragmentation scenes of other types of memories, such as memory defragmentation in a RAM and memory defragmentation in a read-only memory (ROM), which is not limited in the embodiments of this application. In the embodiments of this application, a description is provided by using an example in which the method is applied to the memory defragmentation scene of the GPU. Fragmentation occurs in a video memory managed in the GPU driven scene after frequent allocation and release. To be specific, many idle blocks are distributed in an allocated region of the video memory rather than a tail idle region, and many idle blocks that cannot be reused or allocated exist in a region before a tail idle block (also referred to as TailBlock). In the method provided in the embodiments of this application, the idle blocks located at a head of the memory can be moved to a tail of the memory, so that a video memory provided by the tail idle block can be recycled or reused, thereby expanding a size of available idle blocks in the memory and fully using the idle blocks in the memory.

Figure 2:
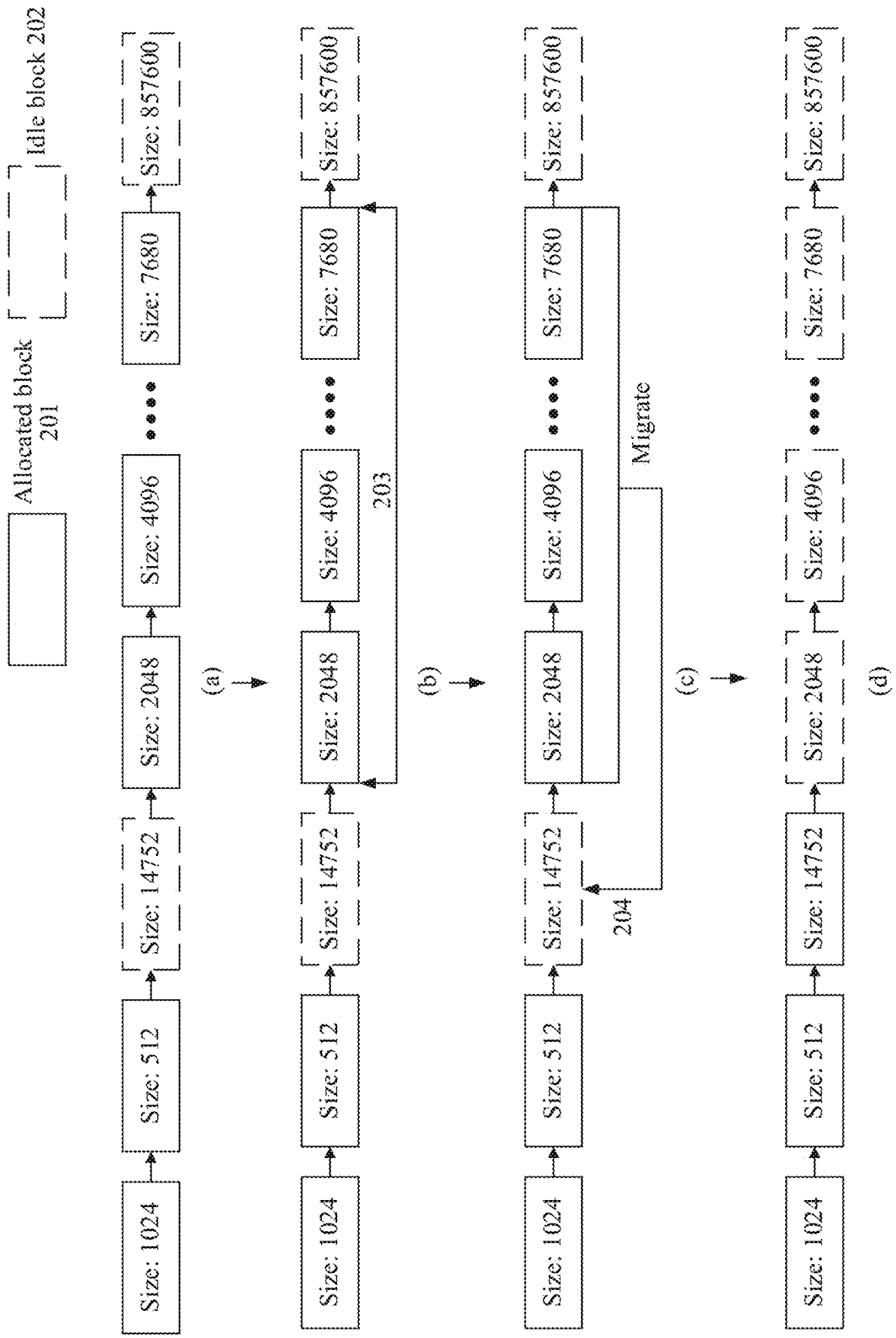
FIG. 2 is a schematic diagram of a memory defragmentation process according to an exemplary embodiment of this application.

FIG. 2 is a schematic diagram of a memory defragmentation process according to an exemplary embodiment of this application. As shown in (a) of FIG. 2, a memory includes a plurality of continuous blocks. The plurality of continuous blocks include allocated blocks 201 (a solid-line box) and idle blocks 202 (a dashed-line box). In addition, the idle blocks 202 include discontinuous idle blocks 202. In other words, an allocated block 201 exists between two idle blocks 202. For example, a plurality of allocated blocks 201 exist between an idle block 202 having a size of 14752 and an idle block 202 having a size of 857600. When a computer device stores data into a block in the memory, the data can only be stored in each of the discontinuous idle blocks 202 separately. If the size of the block of the discontinuous idle blocks 202 is insufficient to store the data, a problem that the idle blocks 202 in the memory cannot be fully used exists. Therefore, memory defragmentation is required.

As shown in (b) of FIG. 2, during the memory defragmentation, the computer device traverses the blocks in the memory from a previous block of a tail idle block 202 in the memory to a head of the memory. The tail idle block 202 refers to an idle block 202 of the idle blocks 202 located at a tail of the memory. For example, the tail idle block is the idle block 202 having the size of 857600. When an $i^{th}$ block obtained by the traversal is an allocated block 201, in response to an $(i+1)^{th}$ block obtained by the traversal being an allocated block 201, the computer device obtains the $(i+1)^{th}$ block as one of m continuous allocated blocks 201. In response to the $(i+1)^{th}$ block obtained by the traversal being an idle block 202, the computer device completes an operation of obtaining the m continuous allocated blocks 201, to obtain the m continuous allocated blocks 201. The m continuous allocated blocks 201 include the $i^{th}$ block. i and m are positive integers, and m is not greater than i.

For example, the computer device traverses the blocks in the memory from an allocated block 201 having a size of 7680 toward the front, uses the allocated block 201 having the size of 7680 as one of the m allocated blocks 201, and then continues the traversal. When a block having a size of 4096 is traversed, it is determined that the block having the size of 4096 is an allocated block 201, and the block having the size of 4096 is used as one of the m continuous allocated blocks 201. Then, when a block having a size of 2048 is traversed, it is determined that the block having the size of 2048 is an allocated block 201, and the block having the size of 2048 is used as one of the m continuous allocated blocks 201. Subsequently, when the block having the size of 14752 is traversed, it is determined that the block having the size of 14752 is an idle block 202. In this case, the computer device ends the obtaining of the m continuous allocated blocks 201, to obtain final m continuous allocated blocks 201, including all blocks 203 from the block having the size of 2048 to the block having the size of 7680. The traversal toward the front in this embodiment of this application refers to traversal toward the head.

As shown in (c) of FIG. 2, when the computer device has obtained a $j^{th}$ block among the m allocated blocks 201, the computer device accumulates a size of the $j^{th}$ block to a calculated block size to update the calculated block size. The calculated block size is determined based on a sum of sizes of all of the obtained m allocated blocks 201, and j is a positive integer. Exemplarily, the sum of the sizes of all of the obtained m allocated blocks 201 is used as the calculated block size. For example, when the computer device has obtained the allocated block 201 having the size of 2048, the computer device adds the size 2048 to the calculated block size to update the calculated block size. The calculated block size is determined based on a sum of sizes of all blocks from the block having the size of 4096 to the block having the size of 7680.

In response to the calculated block size being updated for a $j^{th}$ time, the computer device determines whether the n idle blocks 202 include an idle block 202 having a size not less than the calculated block size updated for the $j^{th}$ time. In response to the n idle blocks 202 including the idle block 202 having the size not less than the calculated block size updated for the $j^{th}$ time, the computer device continues the operation of obtaining the m allocated blocks 201 through the traversal and the operation of updating the calculated block size, and performs the foregoing determining operation. In response to the n idle blocks 202 not including the idle block 202 having the size not less than the calculated block size updated for the $j^{th}$ time, the computer device stops the operation of obtaining the m allocated blocks 201 through the traversal and the operation of updating the calculated block size, and determines, based on m allocated blocks 201 corresponding to a calculated block size updated for a $(j-1)^{th}$ time, a target idle block 204 having a size greater than a size of the m allocated blocks 201 in the n idle blocks 202, j-1 being a positive integer.

For example, when the computer device has obtained the allocated block 201 having the size of 2048, the computer device adds the size 2048 to the calculated block size to update the calculated block size. Then the computer device determines whether the n idle blocks 202 include an idle block 202 satisfying an updated calculated block size. Since the block having the size of 14752 satisfies the updated calculated block size, the computer device continues the operation of obtaining the m allocated blocks 201 through the traversal and the operation of updating the calculated block size, and performs the foregoing determining operation when the calculated block size is updated. In addition, since the block having the size of 14752 traversed by the computer device is an idle block 202, the computer device may determine the final m allocated blocks 201 and the corresponding target idle block 204.

It may be learned from the foregoing description that, the computer device stops the operation of obtaining the m allocated blocks 201 through the traversal and the operation of updating the calculated block size for two reasons. The first reason is that the idle block 202 is traversed, and the second reason is that the n idle blocks 202 do not include the idle block satisfying the updated calculated block size. By cyclically performing the foregoing operations, the computer device can finally determine the m allocated blocks 201 and the corresponding target idle block 204.

As shown in (d) of FIG. 2, the computer device migrates data from the obtained m continuous allocated blocks 201 to the target idle block 204, to complete the memory defragmentation. For example, the computer device migrates data in all blocks 203 from the block having the size of 2048 to the block having the size of 7680 to the block having the size of 14752, to complete the memory defragmentation. In this way, all of the blocks from the block having the size of 2048 to the block having the size of 857600 become idle blocks 202, which can increase a size of a single idle block 202, and facilitate data operations on the tail idle block 202.

Through the migration of the data in the allocated blocks at the tail of the memory to the idle block before the tail idle block, the allocated blocks at the tail can be sorted as idle blocks, and form continuous idle blocks with the tail idle block. In this way, a size of available idle blocks in the memory can be expanded, and the idle blocks in the memory can be fully used.

Next, an implementation of obtaining the m continuous allocated blocks from the tail to the head of the memory is described. In this implementation, blocks in the memory are traversed from a previous block of the tail idle block to the head of the memory. When an $i^{th}$ block obtained by the traversal is an allocated block and the $i^{th}$ block satisfies a size requirement, in response to an $(i+1)^{th}$ block obtained by the traversal being an allocated block and the $(i+1)^{th}$ block not satisfying the size requirement or in response to the $(i+1)^{th}$ block obtained by the traversal being an idle block, each allocated block traversed before the $(i+1)^{th}$ block is used as the m allocated blocks, to complete the operation of obtaining the m allocated blocks. The m allocated blocks include the $i^{th}$ block, and i is a positive integer. That the $i^{th}$ block satisfies a size requirement include that the n idle blocks include an idle block having a size not less than a calculated block size corresponding to the $i^{th}$ block. The $(i+1)^{th}$ block not satisfying the size requirement includes that a size of each of the n idle blocks is less than a calculated block size corresponding to the $(i+1)^{th}$ block.

When the $i^{th}$ block obtained by the traversal is an allocated block and the $i^{th}$ block satisfies the size requirement, there is a possibility that the $(i+1)^{th}$ block obtained by the traversal is an allocated block and the $(i+1)^{th}$ block satisfies the size requirement. In this case, the $(i+1)^{th}$ block is used as one of the m allocated blocks. That the $(i+1)^{th}$ block satisfies the size requirement includes that the n idle blocks include an idle block having a size not less than the calculated block size corresponding to the $(i+1)^{th}$ block.

After the $(i+1)^{th}$ block is used as one of the m allocated blocks, i+1 may be used as updated i. Based on the updated i, an $(i+1)^{th}$ block is further traversed based on the same logic, until a latest traversed block is an allocated block and the latest traversed block does not meet the size requirement, or until the latest traversed block is an idle block. In this case, each allocated block traversed before the latest traversed block is used as the finally obtained m allocated blocks. In other words, the operation of obtaining the m allocated blocks is completed.

The calculated block size corresponding to the $i^{th}$ block refers to a sum of sizes of obtained allocated blocks among the m allocated blocks if the $i^{th}$ block is used as one of the m allocated blocks. The calculated block size corresponding to the $(i+1)^{th}$ block refers to a sum of sizes of obtained allocated blocks among the m allocated blocks if the $(i+1)^{th}$ block is used as one of the m allocated blocks. A principle for determining the calculated block size corresponding to the $i^{th}$ block is the same as that for determining the calculated block size corresponding to the $(i+1)^{th}$ block. A description is provided by using an example in which a calculated block size corresponding to any block obtained by the traversal (which is referred to as the $j^{th}$ block) is determined.

Exemplarily, a manner of determining the calculated block size corresponding to the $j^{th}$ block obtained by the traversal includes: accumulating, when the $j^{th}$ block obtained by the traversal is an allocated block, a size of the $j^{th}$ block to an existing calculated block size, to obtain a calculated block size corresponding to the $j^{th}$ block, the existing calculated block size being determined based on a sum of sizes of all allocated blocks obtained by the traversal before the $j^{th}$ block, and j being a positive integer. For example, the existing calculated block size is the sum of the sizes of the allocated blocks obtained by the traversal before the $j^{th}$ block.

The existing calculated block size is relative to the $j^{th}$ block obtained by the traversal. If a value of j changes, a value of the existing calculated block size changes. For a $1^{st}$ block obtained by the traversal, the existing calculated block size is 0. For a $2^{nd}$ block obtained by the traversal, the existing calculated block size is a calculated block size corresponding to the $1^{st}$ block. For a $3^{rd}$ block obtained by the traversal, the existing calculated block size is a calculated block size corresponding to the $2^{nd}$ block. In other words, during the determining of the calculated block size corresponding to the $(i+1)^{th}$ block, the existing calculated block size is the calculated block size corresponding to the $i^{th}$ block, that is, the calculated block size corresponding to the $(i+1)^{th}$ block is a sum of the calculated block size corresponding to the $i^{th}$ block and the size of the $j^{th}$ block.

For example, as shown in FIG. 2, the computer device traverses the blocks in the memory from the block having the size of 7680 toward the front. Since the block having the size of 7680 is an allocated block 201 and the n idle blocks 202 include an idle block having a size not less than 7680 (such as the block having the size of 14752), the allocated block 201 having the size of 7680 is used as one of the m allocated blocks 201, and then the traversal continues. When the block having the size of 4096 is traversed, since the block having the size of 4096 is an allocated block 201 and the n idle blocks 202 include an idle block having a size not less than 11776 (7680+4096=11776) (such as the block having the size of 14752), the block having the size of 4096 is used as one of the m continuous allocated blocks 201. Then, when the block having the size of 2048 is traversed, since the block having the size of 2048 is an allocated block 201 and the n idle blocks 202 include an idle block having a size not less than 13824 (7680+4096+2048=13824) (such as the block having the size of 14752), the block having the size of 2048 is used as one of the m continuous allocated blocks 201. Next, when the block having the size of 14752 is traversed, since the block having the size 14752 is an idle block 202, the computer device ends the obtaining of the m continuous allocated blocks 201, to obtain the final m continuous allocated blocks 201. The final m continuous allocated blocks 201 include all blocks 203 from the block having the size of 2048 to the block having the size of 7680.

Figure 3:
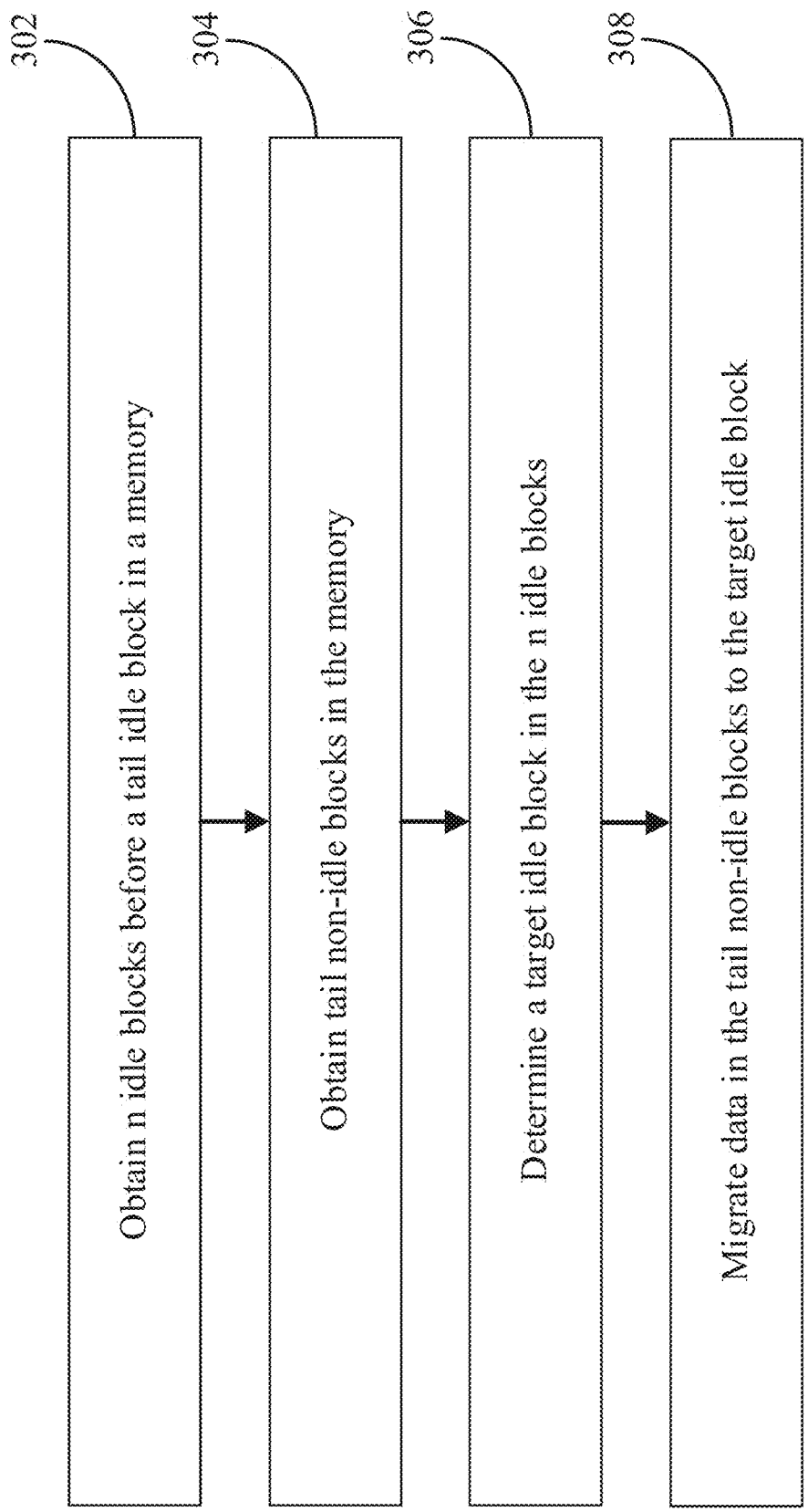
FIG. 3 is a schematic flowchart of a memory defragmentation method according to an exemplary embodiment of this application.

FIG. 3 is a schematic flowchart of a memory defragmentation method according to an exemplary embodiment of this application. The method is performed by a computer device. For example, the method may be applied to a computer device or a client on the computer device. As shown in FIG. 3, the method includes the following operations:

Operation 302: Obtain n idle blocks before a tail idle block in a memory.

The memory is a storage configured to store data, such as a RAM, a ROM, or another type of memory. In some embodiments, the memory belongs to the computer device. The computer device includes a mobile phone, a desktop computer, a notebook computer, a tablet computer, a server, a smart wearable device, an Internet of Things device, and the like. Exemplarily, the memory refers to a video memory of a GPU. In this embodiment of this application, a memory fragment exists in the memory of the GPU. In some embodiments, the memory is a complete memory or a section of the complete memory.

During storage of data into the memory, the data is usually stored in from a head to a tail of the memory. The foregoing sequence may be regarded as a forward sequence or a backward sequence with respect to the memory. The memory includes a plurality of idle blocks and a plurality of allocated blocks. The idle blocks and the allocated blocks are a section of the memory. The idle blocks are blocks having no data stored therein, and the allocated blocks are blocks that having data stored therein. The idle blocks and the allocated blocks are distributed alternately. In addition, different idle blocks may be continuous, different allocated blocks may be continuous, and the idle blocks and the allocated blocks may be continuous. That two blocks are continuous means that addresses of the two blocks in the memory are continuous, that is, a tail address of a preceding block and a header address of a succeeding block are continuous.

A tail of the memory usually has an idle block. The idle block is the tail idle block in the memory. In other words, the tail idle block is an idle block among idle blocks in the memory located at a tail, and n is a positive integer. In some embodiments, the tail idle block is a block or is composed of a plurality of continuous blocks. The tail idle block is not limited to one idle block, and may include a plurality of continuous idle blocks.

During the obtaining of the n idle blocks, the computer device may obtain all or some of the idle blocks in the memory before the tail idle block. Exemplarily, when the computer device obtains some of the idle blocks in the memory located before the tail idle block, in other words, when n is less than a quantity of all idle blocks in the memory before the tail idle block, the computer device may use n blocks closest to the tail idle block as the obtained n idle blocks, or may use any n blocks of all of the idle blocks as the obtained n idle blocks. A value of n may be set based on experience, or may be flexibly adjusted based on a quantity of blocks in the memory and an actual data storage situation, which is not limited in this embodiment of this application.

The tail of the memory in this embodiment of this application is a relative concept. The tail of the memory is determined based on an arrangement direction of the blocks in the memory, and an end of the direction in the memory is the tail of the memory. The arrangement direction of the blocks may be regarded as an arrangement direction of memory addresses or an arrangement direction of data stored in the memory. If the arrangement direction of the blocks changes, the tail of the memory changes. For example, in FIG. 2, if an arrow toward the right indicates that the blocks are sorted from left to right, a right end of the memory is the tail of memory. If an arrow toward the left indicates that the blocks are sorted from right to left, a left end of the memory is the tail of the memory.

In some embodiments, the computer device may obtain the n idle blocks by traversing the blocks in the memory toward the front from a previous block of the tail idle block. In some embodiments, when the computer device stores data into the memory or releases data stored in the memory, the computer device updates the obtained n idle blocks. Alternatively, the computer device may update the obtained n idle blocks based on instructions. Alternatively, the computer device may periodically update the obtained n idle blocks.

Operation 304: Obtain tail non-idle blocks in the memory.

The tail non-idle blocks include one block or a plurality of continuous blocks before the tail idle block in the memory, and include at least one allocated block. The previous block of the tail idle block is usually an allocated block. In other words, when the tail non-idle blocks include only one block, the tail non-idle block is an allocated block. The tail non-idle blocks and the tail idle block are continuous. In other words, one of the tail non-idle blocks farthest away from the head is the previous block of the tail idle block. Exemplarily, when the tail non-idle blocks include only one block, the block is the previous block of the tail idle block.

Exemplarily, the tail non-idle blocks obtained by the computer device includes a block 1, a block 2, a block 3, a block 4, and a block 5 that are continuous before the tail idle block in the memory. The block 1, the block 2, the block 4, and the block 5 are allocated blocks. The block 3 is an idle block. Exemplarily, the block 1 or the block 5 is the previous block of the tail idle block to ensure that the tail non-idle blocks and the tail idle block are continuous.

The computer device usually obtains the blocks in the memory by traversing the blocks. Therefore, when the tail non-idle blocks are obtained, the idle block and the allocated blocks may also be obtained. In some embodiments, during execution of the operation, the computer device may obtain only the allocated block from the previous block of the tail idle block toward the front, to obtain the tail non-idle blocks. In this case, the computer device obtains one or more allocated blocks. The one or more allocated blocks are continuous, discontinuous, or partially continuous.

Operation 306: Determine a target idle block in the n idle blocks.

A size of the target idle block is not less than a size of the allocated block among the tail non-idle blocks. In other words, the size of the target idle block is not less than a sum of sizes of all allocated blocks among the tail non-idle blocks. In some embodiments, the size of the target idle block is not less than a size occupied by all data in the tail non-idle blocks.

In some embodiments, after obtaining the tail non-idle blocks, the computer device accumulates the sizes of the allocated blocks among the tail non-idle blocks, and then determines the target idle block based on a result of the accumulation. In some embodiments, during the determining of the target idle block, the computer device determines, in the n idle blocks, an idle block having a size which is the smallest but greater than the size of the allocated block among the tail non-idle blocks, and uses the idle block having the smallest size as the target idle block. In some embodiments, a position and a size of each of the n idle blocks in the memory are stored in a red-black tree data structure. The computer device determines the target idle block having a size which is the smallest but greater than the size of the allocated block among the tail non-idle blocks by using the red-black tree.

Operation 308: Migrate data in the tail non-idle blocks to the target idle block.

The computer device stores the data in each allocated block among the tail non-idle blocks into the target idle block, and releases the data in each allocated block among the tail non-idle blocks, thereby achieving the migration of the data. In some embodiments, during the migration of the data, the computer device stores the migrated data into the target idle block starting from a starting address (a header position) of the target idle block. For data in different allocated blocks, the computer device stores the data in a sequence of the allocated blocks. During storage of data in different allocated blocks, the data in the different allocated blocks is stored continuously, separately, or partially separately.

After the data is migrated, the tail non-idle blocks become idle blocks. In some embodiments, the computer device merges the obtained idle blocks with the tail idle block, to expand the size of the tail idle block.

Based on the above, in the method provided in this embodiment, through the migration of the data in the tail non-idle blocks in the memory to the idle block before the tail idle block, the tail non-idle blocks can be sorted as idle blocks, and form continuous idle blocks with the tail idle block. In this way, a size of available idle blocks in the memory can be expanded, and the idle blocks in the memory can be fully used.

Figure 4:
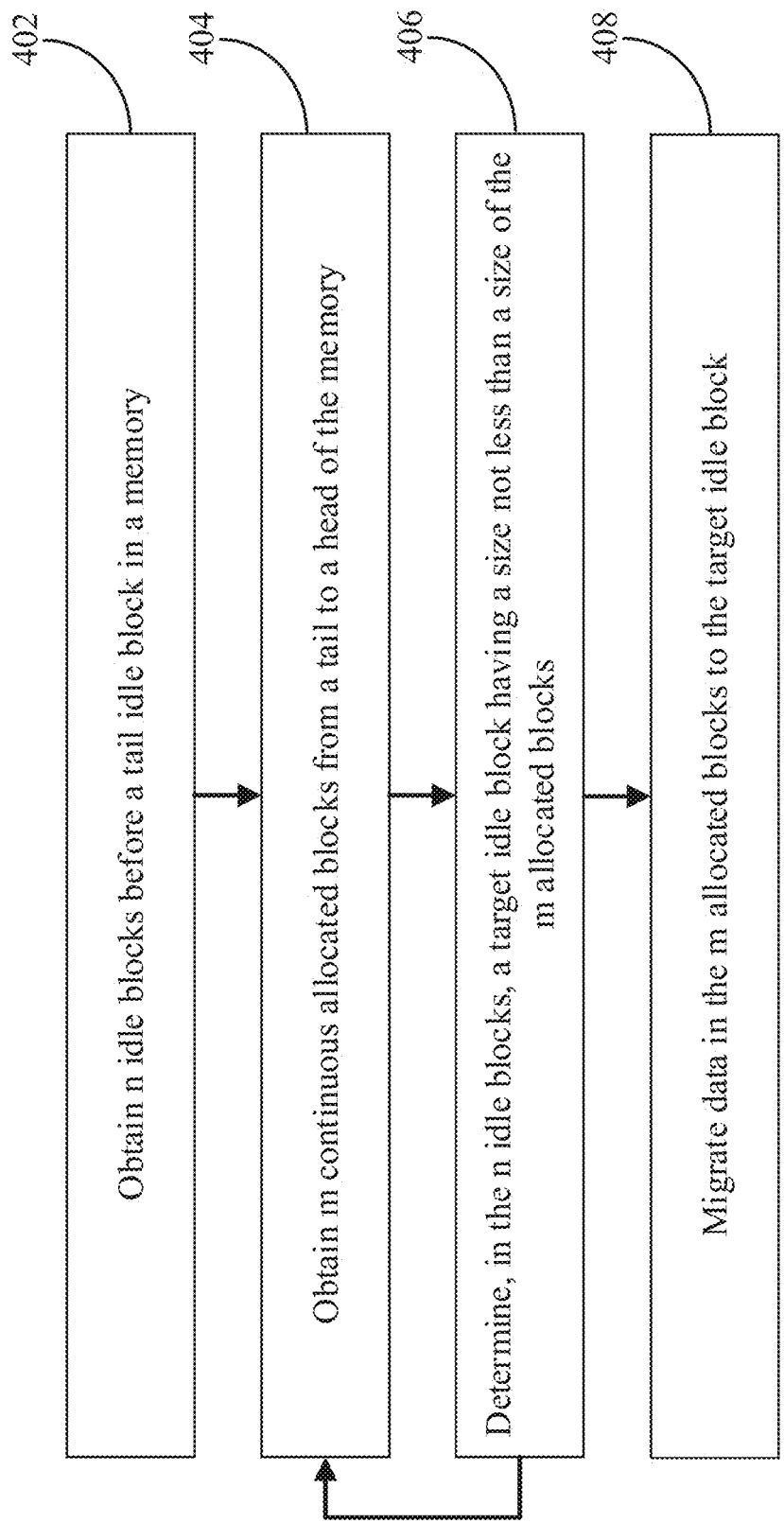
FIG. 4 is a schematic flowchart of a memory defragmentation method according to an exemplary embodiment of this application.

FIG. 4 is a schematic flowchart of a memory defragmentation method according to an exemplary embodiment of this application. The method is performed by a computer device. For example, the method may be applied to a computer device or a client on the computer device. As shown in FIG. 4, the method includes the following operations:

Operation 402: Obtaining n idle blocks before a tail idle block in a memory.

The memory is a memory configured to store data. Exemplarily, the memory refers to a video memory of a GPU. In this embodiment of this application, memory fragments exist in the memory of the GPU. In some embodiments, the memory is a complete memory or a section of the complete memory.

A tail of the memory usually has an idle block. The idle block is the tail idle block in the memory. In other words, the tail idle block is an idle block among idle blocks in the memory located at a tail, and n is a positive integer. During the obtaining of the n idle blocks, the computer device may obtain all or some of the idle blocks in the memory before the tail idle block.

In some embodiments, the computer device may obtain the n idle blocks by traversing the blocks in the memory toward the front from a previous block of the tail idle block. In some embodiments, a position and a size of each of the n idle blocks in the memory are stored in a red-black tree data structure. For the storage in the red-black tree data structure, since the computer device may obtain data required for completing a query in time O (log x) through the red-black tree, x being a quantity of idle blocks stored in the red-black tree, time consumed in subsequent querying for each idle block can be reduced.

Operation 404: Obtain m continuous allocated blocks from the tail to a head of the memory.

m is a positive integer. The m continuous allocated blocks refer to m continuous allocated blocks with continuous addresses in the memory, and no idle block exists between any two allocated blocks among the m allocated blocks. Exemplarily, one of the m allocated blocks farthest away from the head is a previous block of the tail idle block, so as to ensure that tail non-idle blocks composed of the m continuous allocated blocks and the tail idle block are continuous.

In some embodiments, the computer device traverses blocks in the memory from a previous block of the tail idle block to the head of the memory. When an $i^{th}$ block obtained by the traversal is an allocated block, in response to an $(i+1)^{th}$ block obtained by the traversal is an allocated block, the computer device obtains the $(i+1)^{th}$ block as one of the m allocated blocks. When the $i^{th}$ block obtained by the traversal is an allocated block, in response to the $(i+1)^{th}$ block obtained by the traversal being an idle block, the computer device obtains the m allocated blocks. The m allocated blocks include the $i^{th}$ block, i is a positive integer, and i+1 is not greater than m.

Exemplarily, during the obtaining of the m continuous allocated blocks, the computer device first traverses a $1^{st}$ block, which is a block 1. If the block 1 is an allocated block, the computer device obtains the block 1 as one of the m allocated blocks. Then the computer device traverses a $2^{nd}$ block, which is a block 2. If the block 2 is an allocated block, the computer device obtains the block 2 as one of the m allocated blocks. Then the computer device traverses a $3^{rd}$ block, which is a block 3. If the block 3 is an allocated block, the computer device obtains the block 3 as one of the m allocated blocks. Then the computer device traverses a $4^{th}$ block, which is a block 4. If the block 4 is an idle block, the computer device determines that the obtaining of the m allocated blocks is completed. In this case, the m allocated blocks obtained by the computer device are 3 continuous allocated blocks, namely, the block 1, the block 2, and the block 3.

Exemplarily, still referring to FIG. 2, the computer device traverses the blocks in the memory from the block having the size of 7680, uses the block having the size of 7680 as one of the m allocated blocks, and then continues the traversal according to the foregoing operations. Then, when the block having the size of 2048 is traversed, it is determined that the block having the size of 2048 is an allocated block, and the block having the size of 2048 is used as one of the m continuous allocated blocks. Subsequently, when the block having the size of 14752 is traversed, it is determined that the block having the size of 14752 is an idle block. In this case, the computer device ends the obtaining of the m continuous allocated blocks, to obtain finally obtained m continuous allocated blocks, including all blocks from the block having the size of 2048 to the block having the size of 7680.

When the computer device has obtained a $j^{th}$ block among the m allocated blocks, the computer device accumulates a size of the $j^{th}$ block to a calculated block size (which may be referred to as a SumBlockSize) to update the calculated block size. In other words, during the obtaining of the m allocated blocks, the computer device further determines the calculated block size. In addition, each time a new block among the m allocated blocks is obtained, the computer device updates the calculated block size. The calculated block size is determined based on a sum of sizes of all of the obtained m allocated blocks, j is a positive integer, and j is not greater than m.

Exemplarily, during the obtaining of the m continuous allocated blocks, the computer device has first obtained the block 1. If a size of the block 1 is a size 1, the computer device determines that a current calculated block size is the size 1. Then the computer device has obtained the block 2. If a size of the block 2 is a size 2, the computer device determines updates a current calculated block size to size 1+size 2. Then the computer device has obtained the block 3. If a size of the block 3 is a size 3, the computer device determines updates a current calculated block size to size 1+size 2+size 3. Then, if the computer device determines that a currently traversed block 4 is an idle block, the computer device stops the obtaining of the m allocated blocks, and stops the updating of the calculated block size. In this case, the computer device has obtained 3 continuous allocated blocks, namely, the block 1, the block 2, and the block 3, and the current calculated block size is size 1+size 2+size 3.

Operation 406: Determine, in the n idle blocks, a target idle block having a size not less than a size of the m allocated blocks.

In response to the calculated block size being updated for a $j^{th}$ time, the computer device determines whether the n idle blocks include an idle block having a size not less than the calculated block size updated for the $j^{th}$ time. In other words, during each updating of the calculated block size, the computer device determines whether the n idle block include an idle block having a size not less than the current calculated block size.

In response to the n idle blocks include the idle block having the size not less than the calculated block size updated for the $j^{th}$ time, the computer device repeats the operation of obtaining the m allocated blocks through the traversal and the operation of updating the calculated block size, and performs the operation of determining the target idle block (in other words, operation 406 is repeated).

In response to the n idle blocks not including the idle block having the size not less than the calculated block size updated for the $j^{th}$ time, the computer device stops the operation of obtaining the m allocated blocks through the traversal and the operation of updating the calculated block size, and determines, based on m allocated blocks corresponding to a calculated block size updated for a $(j-1)^{th}$ time, the target idle block in the n idle blocks, j−1 being a positive integer, and j−1 being not greater than m. In this case, the m allocated blocks finally obtained by the computer device are the m allocated blocks corresponding to the calculated block size updated for a $(j-1)^{th}$ time, that is, allocated block obtained by removing a latest obtained allocated block (an $(m-1)^{th}$ allocated block) from the obtained allocated blocks. The size of the target idle block determined by the computer device is not less than the size of the m allocated blocks obtained by the computer device.

It may be learned from the foregoing description that, the computer device stops the operation of obtaining the m allocated blocks through the traversal and the operation of updating the calculated block size for two reasons.

The first reason is that an idle block is traversed during the obtaining of the m continuous allocated blocks.

The second reason is that the n idle blocks do not include an idle block having a size greater than a size of a recently updated calculated block size. By cyclically performs the foregoing operations, the computer device can finally determine the m allocated blocks obtained by the computer device and the corresponding target idle block.

For example, still referring to FIG. 2, during the obtaining of the m allocated blocks, when the computer device has obtained the allocated block having the size of 2048, the computer device accumulates the size 2048 to the calculated block size to update the calculated block size. Then the computer device determines whether the n idle blocks include an idle block satisfying a current calculated block size. Since the block having the size of 14752 satisfies the current calculated block size, the computer device repeats the operation of obtaining the m allocated blocks through the traversal and the operation of updating the calculated block size, and performs the foregoing operation of determining whether the n idle blocks include the idle block satisfying the current calculated block size during the updating of the calculated block size. In addition, since the block having the size of 14752 traversed by the computer device is an idle block, the computer device may determine the final m allocated blocks and the corresponding target idle block.

In combination with the foregoing examples, if the foregoing block having the size of 14752 is replaced with a block having a smaller size, during the determining, since a size of the replacement block does not meet the current calculated block size, the computer device stops the operation of obtaining the m allocated blocks through the traversal and the operation of updating the calculated block size, and determines the target idle block based on a previously updated calculated block size. In this case, the m allocated blocks obtained by the computer device include the block having the size of 4096 to the block having the size of 7680.

The target idle block is determined based on the finally obtained m allocated blocks. In a possible implementation, a process of obtaining the final m allocated blocks includes the following: Blocks in the memory are traversed from a previous block of the tail idle block to the head of the memory. When an $i^{th}$ block obtained by the traversal is an allocated block and the $i^{th}$ block satisfies a size requirement, in response to an $(i+1)^{th}$ block obtained by the traversal being an allocated block and the $(i+1)^{th}$ block not satisfying the size requirement or in response to the $(i+1)^{th}$ block obtained by the traversal being an idle block, each allocated block traversed before the $(i+1)^{th}$ block is used as the m allocated blocks, to complete the operation of obtaining the m allocated blocks. The m allocated blocks include the $i^{th}$ block, and i is a positive integer. That the $i^{th}$ block satisfies a size requirement include that the n idle blocks include an idle block having a size not less than a calculated block size corresponding to the $i^{th}$ block. The $(i+1)^{th}$ block not satisfying the size requirement includes that a size of each of the n idle blocks is less than a calculated block size corresponding to the $(i+1)^{th}$ block.

When the $i^{th}$ block obtained by the traversal is an allocated block and the $i^{th}$ block satisfies the size requirement, there is a possibility that the $(i+1)^{th}$ block obtained by the traversal is an allocated block and the $(i+1)^{th}$ block satisfies the size requirement. In this case, the $(i+1)^{th}$ block is used as one of the m allocated blocks. That the $(i+1)^{th}$ block satisfies the size requirement includes that the n idle blocks include an idle block having a size not less than the calculated block size corresponding to the $(i+1)^{th}$ block.

After the $(i+1)^{th}$ block is used as one of the m allocated blocks, i+1 may be used as updated i. Based on the updated i, an $(i+1)^{th}$ block is further traversed based on the same logic, until a latest traversed block is an allocated block and the latest traversed block does not meet the size requirement, or until the latest traversed block is an idle block. In this case, each allocated block traversed before the latest traversed block is used as the finally obtained m allocated blocks. In other words, the operation of obtaining the m allocated blocks is completed.

Exemplarily, during the obtaining of the m continuous allocated blocks, the computer device first traverses a $1^{st}$ block, which is a block 1. If the block 1 is an allocated block and the block 1 satisfies the size requirement, the computer device obtains the block 1 as one of the m allocated blocks. Then the computer device traverses a 2nd block, which is a block 2. If the block 2 is an allocated block and the block 2 satisfies the size requirement, the computer device obtains the block 2 as one of the m allocated blocks. Then the computer device traverses a $3^{rd}$ block, which is a block 3. If the block 3 is an allocated block and the block 3 satisfies the size requirement, the computer device obtains the block 3 as one of the m allocated blocks. Then the computer device traverses a $4^{th}$ block, which is a block 4. If the block 4 is an idle block, the computer device determines that the obtaining of the m allocated blocks is completed. In this case, the m allocated blocks obtained by the computer device are 3 continuous allocated blocks, namely, the block 1, the block 2, and the block 3.

A principle for determining the calculated block size corresponding to the $i^{th}$ block is the same as that for determining the calculated block size corresponding to the $(i+1)^{th}$ block. A description is provided by using an example in which a calculated block size corresponding to any block obtained by the traversal (which is referred to as the $j^{th}$ block) is determined. Exemplarily, a manner of determining the calculated block size corresponding to the $j^{th}$ block obtained by the traversal includes: accumulating, when the $j^{th}$ block obtained by the traversal is an allocated block, a size of the $j^{th}$ block to an existing calculated block size, to obtain a calculated block size corresponding to the $j^{th}$ block, the existing calculated block size being determined based on a sum of sizes of all allocated blocks obtained by the traversal before the $j^{th}$ block, and j being a positive integer. For example, the existing calculated block size is the sum of the sizes of the allocated blocks obtained by the traversal before the $j^{th}$ block.

For example, during the obtaining of the m continuous allocated blocks, the computer device has first obtained the block 1. If the block 1 is an allocated block and has a size 1, since an existing calculated block size with respect to the block 1 is 0, the computer device determines that a calculated block size corresponding to the block 1 is the size 1. Then the computer device has obtained a block 2. If the block 2 is an allocated block and has a size 2, since the existing calculated block size with respect to the block 1 is the size 1, the computer device updates a current calculated block size to size 1+the size 2. In other words, a calculated block size corresponding to block 2 is size 1+size 2. Then the computer device has obtained a block 3. If the block 3 is an allocated block and has a size 3, since the existing calculated block size with respect to the block 2 is size 1+size 2, the computer device updates a current calculated block size to size 1+the size 2+size 3. In other words, a calculated block size corresponding to block 3 is size 1+size 2+size 3. Then, if the computer device determines that a currently traversed block 4 is an idle block, the computer device stops the obtaining of the m allocated blocks, and stops the updating of the calculated block size. In this case, the computer device has obtained 3 continuous allocated blocks, namely, the block 1, the block 2, and the block 3, and the current calculated block size is size 1+size 2+size 3.

Exemplarily, the n idle blocks may include one or more idle blocks having a size not less than the size of the m allocated blocks. If the n idle blocks include one idle block having a size not less than the size of the m allocated blocks, the idle block having the size not less than the size of the m allocated blocks is used as the target idle block. If the n idle blocks include a plurality of idle blocks having a size not less than the size of the m allocated blocks, one of the idle blocks having the size not less than the size of the m allocated blocks having a smallest size may be used as the target idle block.

In some embodiments, in response to the calculated block size being updated for the $(j-1)^{th}$ time, the computer device determines, in the n idle blocks, a candidate idle block having a size not less than the calculated block size updated for the $(j-1)^{th}$ time. Then, in response to the calculated block size being updated for the $j^{th}$ time, the computer device determines whether the size of the candidate idle block corresponding to the calculated block size updated for the $(j-1)^{th}$ time is not less than the calculated block size updated for the $j^{th}$ time.

In response to the size of the candidate idle block being not less than the calculated block size updated for the $j^{th}$ time, the computer device repeats the operation of obtaining the m allocated blocks through the traversal and the operation of updating the calculated block size, and performs the operation of comparing the updated calculated block size with the size of the candidate idle block.

In response to the size of the candidate idle block being not less than the calculated block size updated for the $j^{th}$ time, the computer device performs the operation of determining whether the n idle blocks include the idle block having the size not less than the calculated block size updated for the $j^{th}$ time. In this case, if the n idle blocks include the idle block having the size not less than the calculated block size updated for the $j^{th}$ time, the computer device determines the idle block satisfying the condition as a new candidate idle block, and uses the idle block during next execution of the foregoing determining. If the idle block having the size not less than the calculated block size updated for the $j^{th}$ time does not exist, the computer device stops the operation of obtaining the m allocated blocks through the traversal and the operation of updating the calculated block size, and finally determines the m allocated blocks obtained by the computer device and the target idle block.

Exemplarily, during the obtaining of the m allocated blocks, if the computer device has obtained a $4^{th}$ allocated block, the computer device updates the calculated block size for the $4^{th}$ time, and compares the calculated block size updated for the $4^{th}$ time with a size of a candidate idle block corresponding to a calculated block size updated for the $3^{rd}$ time. The following situations may exist:

(1) If the calculated block size updated for the $4^{th}$ time is less than the size of the candidate idle block corresponding to the calculated block size updated for the $3^{rd}$ time, the computer device continues the obtaining of the m allocated blocks and the updating of the calculated block size, and performs the foregoing determining during next updating of the calculated block size.

(2) If the calculated block size updated for the $4^{th}$ time is not less than the size of the candidate idle block corresponding to the calculated block size updated for the $3^{rd}$ time, the computer device determines whether the n idle blocks include an idle block having a size greater than the calculated block size updated for the $4^{th}$ time. If the n idle blocks include the idle block having the size greater than the calculated block size updated for the $4^{th}$ time, the computer device determines the idle block satisfying the condition as a new candidate idle block, and performs the foregoing determining by using the updated candidate idle block during next updating of the calculated block size. Exemplarily, an implementation in which the computer device determines whether the n idle blocks include the idle block having the size not less than the calculated block size updated for the $4^{th}$ time is as follows: The computer device determines whether idle blocks among the n idle blocks other than the candidate idle block include the idle block having the size greater than the calculated block size updated for the $4^{th}$ time, to avoid repeated comparison with the candidate idle block, thereby reducing a calculation amount.

(3) If the n idle blocks do not include the idle block having the size greater than the calculated block size updated for the $4^{th}$ time, the computer device stops the operation of obtaining the m allocated blocks through the traversal and the operation of updating the calculated block size, and finally determines that 3 allocated blocks are obtained and determines the corresponding target idle block.

In other words, in response to the $i^{th}$ block satisfying the size requirement, the candidate idle block having a size not less than the calculated block size corresponding to the $i^{th}$ block is determined in the n idle blocks. For example, an idle block among the n idle blocks having a size which is the smallest but not less than the calculated block size corresponding to the $i^{th}$ block is used as the candidate idle block. For another example, an idle block among the n idle blocks having a size which is the largest and not less than the calculated block size corresponding to the $i^{th}$ block is used as the candidate idle block. For another example, any one of the n idle blocks having a size not less than the calculated block size corresponding to the $i^{th}$ block is used as the candidate idle block.

When the candidate idle block is determined, that the n idle blocks include the idle block having the size not less than the calculated block size corresponding to the $(i+1)^{th}$ block includes the following two cases: Case 1: The size of the candidate idle block is not less than the calculated block size corresponding to the $(i+1)^{th}$ block. Case 2: The idle blocks among the n idle blocks other than the candidate idle block include the idle block having the size not less than the calculated block size corresponding to the $(i+1)^{th}$ block.

In some embodiments, a position and a size of each of the n idle blocks in the memory are stored in a red-black tree data structure. Through the red-black tree, the computer device determines, in the n idle blocks, an idle block having the size which is the smallest but greater than the size of the finally determined m allocated blocks as the target idle block.

Operation 408: Migrate data in the m allocated blocks to the target idle block.

The computer device stores the data in each of the m allocated blocks into the target idle block, and releases the data in each of the m allocated blocks, thereby achieving the migration of the data. In some embodiments, during the migration of the data, the computer device stores the migrated data into the target idle block starting from a starting address of the target idle block.

In some embodiments, the computer device performs the foregoing memory defragmentation operation based on a memory defragmentation instruction. The computer device receives a memory defragmentation instruction, the memory defragmentation instruction including a defragmentation size, the defragmentation size being configured for indicating a size of memory fragments to be sorted in processing of an image data frame. In processing of an image data frame, in response to the size of the allocated block which is sorted being less than the defragmentation size, the computer device continues the memory defragmentation operation. In other words, operation 402 to operation 408 are repeated based on a current memory which is defragmented. In other words, the operation of obtaining the n idle blocks before the tail idle block in the memory is performed in the processing of the image data frame in response to the size of the allocated block which is sorted being less than the defragmentation size. In the processing of the image data frame, the computer device determines that the memory defragmentation is completed in response to the size of the allocated block which is sorted being not less than the defragmentation size.

Figure 5:
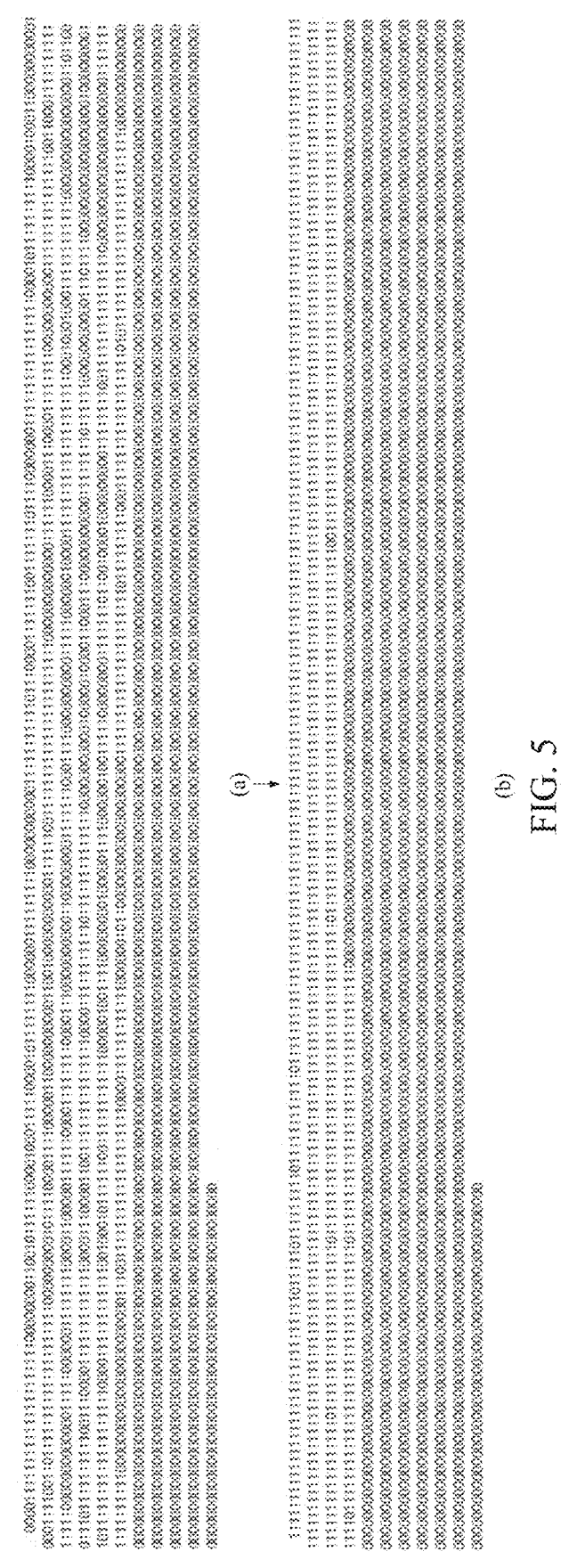

FIG. 5 is a schematic diagram of a memory according to an exemplary embodiment of this application. Content shown in (a) of FIG. 5 represents a memory before memory defragmentation. Content shown in (b) of FIG. 5 represents a memory after the memory defragmentation performed through the foregoing operations. A plurality of continuous "1" represent allocated blocks, and a plurality of continuous "0" represent idle blocks. In the memory shown in (a) of FIG. 5, a size of a tail idle block (also referred to as an end no busy block size) is 9841664, a size of all blocks other than the tail idle block (also referred to as a begin all block size) is 6935552, a size of all idle blocks other than the tail idle block (also referred to as a begin no busy block size) is 4144640, and a current fragmentation rate (also referred to as a percent rate) is 4144640/6935552=0.597593. In the memory shown in (b) of FIG. 5, after the memory defragmentation performed through the foregoing operations, the size of the tail idle block is 13955072, the size of all of the blocks other than the tail idle blocks is 2822144, the size of all of the idle blocks other than the tail idle blocks is 31232, and the current fragmentation rate (also referred to as a percent rate) is 31232/2822144=0.011067. After the memory defragmentation performed through the foregoing operations, the size of the tail idle block in the memory is significantly increased, and the percent rate of the memory is significantly reduced.

Based on the above, in the method provided in this embodiment, through the migration of the data in the m allocated blocks at the tail of the memory to the idle block before the tail idle block, the m allocated blocks at the tail can be sorted as idle blocks, and form continuous idle blocks with the tail idle block. In this way, a size of available idle blocks in the memory can be expanded, and the idle blocks in the memory can be fully used.

In the method provided in this embodiment, the m continuous allocated blocks are obtained from the tail to the head of the memory, and the target idle block is determined, which provides a manner of releasing a storage space at the tail of the memory.

In the method provided in this embodiment, the allocated blocks are obtained by traversing the blocks of the memory, which provides an accurate manner of obtaining the allocated blocks at the tail.

In the method provided in this embodiment, the calculated block size is further updated when the allocated blocks are obtained, which achieves accurate determining of a total size of currently obtained allocated blocks, thereby facilitating subsequent calculation.

In the method provided in this embodiment, during the obtaining of the allocated blocks, it is further determined whether the n idle blocks idle blocks include the idle block satisfying the currently updated calculated block size, to avoid a failure in finding out an idle block that can accommodate the plurality of the obtained allocated blocks, thereby improving efficiency of the memory defragmentation.

In the method provided in this embodiment, it is further determined whether a requirement on a calculated block size updated next time can be met by using the candidate idle block determined based on the previously updated the calculated block size, to avoid repeated searching of the idle blocks, thereby reducing a quantity of times the idle blocks are searched, and improving the efficiency of the memory defragmentation.

In the method provided in this embodiment, information of the idle blocks in the memory is maintained through a red-black tree. Because high data query efficiency can be achieved through the red-black tree data structure, efficiency of querying the idle blocks can be improved.

In the method provided in this embodiment, memory defragmentation is further performed based on the memory defragmentation instruction, which can control a memory defragmentation quantity based on a need of a user, thereby improving user experience.

In the method provided in this embodiment, memory fragmentation in the GPU is further supported, which provides an implementation of memory fragmentation in the GPU.

The sequence of the operations of the method provided in the embodiments of this application may be properly adjusted. The operations may also be increased or reduced according to a situation. Any variation of the method readily figured out by a person skilled in the art within the technical scope disclosed in this application falls within the protection scope of this application. Details are not described herein.

Figure 6:
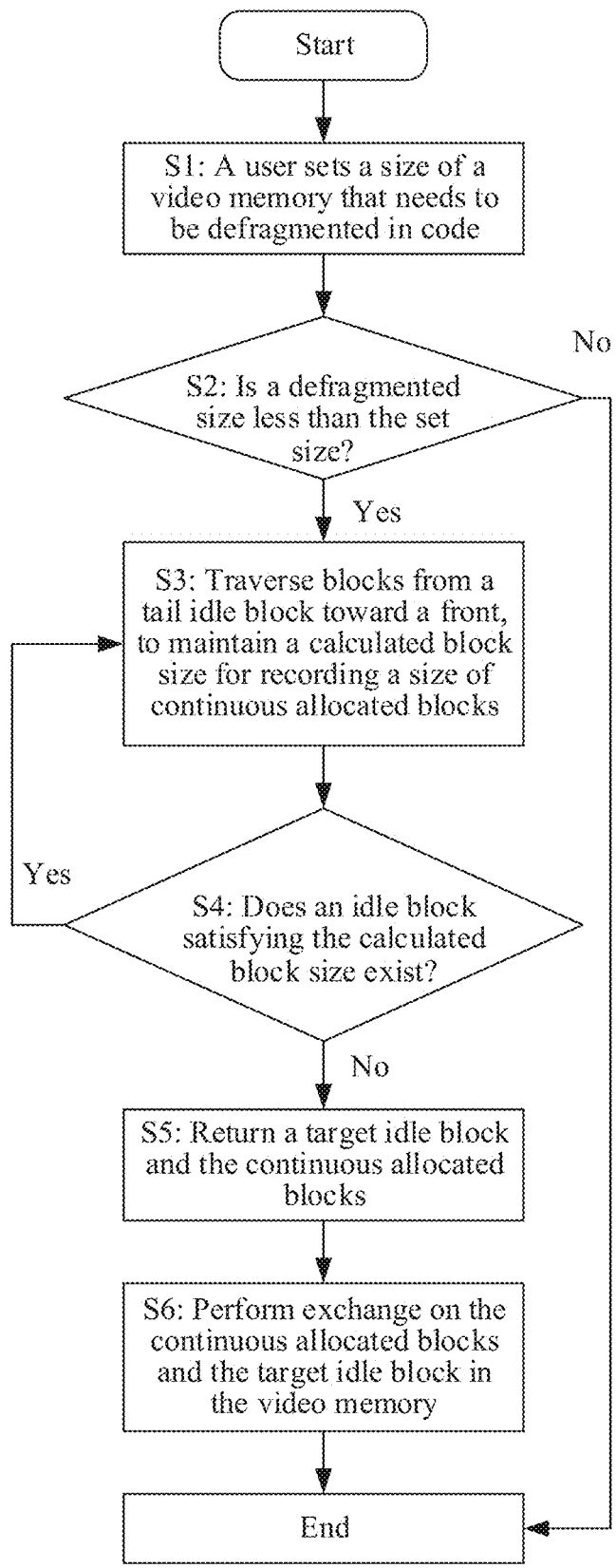
FIG. 6 is a schematic diagram of a memory defragmentation process according to an exemplary embodiment of this application.

The method provided in the embodiments of this application is applied to a memory defragmentation scene of a video memory, for example. FIG. 6 is a schematic diagram of a memory defragmentation process according to an exemplary embodiment of this application. Refer to FIG. 6. Operation S1: A user sets a size of a video memory that needs to be defragmented in code, and a computer device receives a memory defragmentation instruction. Operation S2: The computer device determines whether a size of memory fragments which are sorted is less than a size set by the user. If the size of the memory fragments which are sorted is not less than the size set by the user, the memory defragmentation is stopped. If the size of the memory fragments which are sorted is less than the size set by the user, operation S3 is performed. Operation S3: The computer device traverses blocks in the memory from a tail idle block toward a front (which may be referred to as TailBlock-→prev), to maintain a calculated block size (a SumBlockSize) for recording a size of continuous allocated blocks. In this process, the SumBlockSize is accumulated at a pointer position in the memory during each traversal. Operation S4: The computer device determines whether an idle block satisfying a current calculated block size exists. If the idle block satisfying the current calculated block size exists, operation S3 is repeated. if the idle block satisfying the current calculated block size does not exist, operation S5 is performed. In some embodiments, the computer device searches the blocks for the idle block satisfying the condition through a SearchBlock algorithm. Operation S5: The computer device returns a target idle block and obtained continuous allocated blocks. In this case, the target idle block is a largest block that can be recycled in the memory in a current situation. Operation S6: The computer device performs exchange on the continuous allocated blocks and the target idle block in the video memory.

Through the foregoing process, memory fragments in the allocated regions of the memory are sorted and moved to a tail of the memory for unified management or reuse, which can satisfy a percent rate requirement in a GPU driven scene. During the foregoing memory defragmentation, for idle blocks in the video memory, a block list (also referred to as a BlockList) is traversed from a previous block of a TailBlock toward the front, to find out a largest region of continuous allocated blocks. The idle block list maintained through the red-black tree is queried for an idle block that can accommodate the region, and the region is exchanged with the idle block. In this way, an idle region can be merged into a video memory region pointed by the TailBlock, so that an idle space at the tail is enlarged. After the foregoing defragmentation is performed a plurality of times, a sufficiently large idle TailBlock can be finally obtained, which may be reused, thereby fully using the idle blocks in the memory.

Through the method provided in this embodiment of this application, the video memory fragments managed in the GPU driven scene can be sorted to the tail of the video memory. In this way, the entire video memory can be recycled or reused. In a practical test, a percent rate in a range of 40% to 50% can be reduced to about 1% after the defragmentation, which indicates good performance.

In a specific game project, running of a game character on a map triggers loading and unloading of a model in the GPU driven scene. Therefore, a percent rate is usually high. Through the management of the GPU video memory by using the method provided in this embodiment of this application, a quantity of requests for allocating a new video memory during game operation can be effectively reduced, and a video memory reuse rate can be improved, which can provide a video memory reuse possibility in subsequent development.

Figure 7:
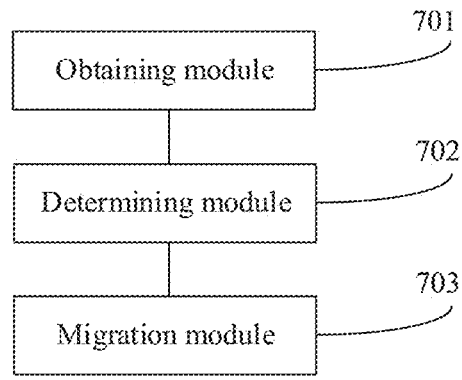
FIG. 7 is a schematic structural diagram of a memory defragmentation apparatus according to an exemplary embodiment of this application.

FIG. 7 is a schematic structural diagram of a memory defragmentation apparatus according to an exemplary embodiment of this application. The apparatus is applicable to a computer device. As shown in FIG. 7, the apparatus includes:

an obtaining module 701, configured to obtain n idle blocks before a tail idle block in a memory, the tail idle block being an idle block among idle blocks in the memory located at a tail, and n being a positive integer, the obtaining module 701 being further configured to obtain tail non-idle blocks in the memory, the tail non-idle blocks including one block or a plurality of continuous blocks before the tail idle block in the memory, and including at least one allocated block, and the tail non-idle blocks and the tail idle block being continuous;

a determining module 702, configured to determine a target idle block in the n idle blocks, a size of the target idle block being not less than a size of the allocated block among the tail non-idle blocks; and a migration module 703, configured to migrate data in the tail non-idle blocks to the target idle block.

In some embodiments, the obtaining module 701 is configured to:

obtain m continuous allocated blocks from the tail to a head of the memory, m being a positive integer.

The determining module 702 is configured to:

determine, in the n idle blocks, a target idle block having a size not less than a size of the m allocated blocks.

In some embodiments, the obtaining module 701 is configured to:

traverse blocks in the memory from a previous block of the tail idle block to the head of the memory;

use, when an $i^{th}$ block obtained by the traversal is an allocated block and the $i^{th}$ block satisfies a size requirement in response to an $(i+1)^{th}$ block obtained by the traversal being an allocated block and the $(i+1)^{th}$ block not satisfying the size requirement or in response to the $(i+1)^{th}$ block obtained by the traversal being an idle block, each allocated block traversed before the $(i+1)^{th}$ block as the m allocated blocks, the m allocated blocks including the $i^{th}$ block, and i being a positive integer;

that the $i^{th}$ block satisfies a size requirement including that the n idle blocks include an idle block having a size not less than a calculated block size corresponding to the $i^{th}$ block, and the $(i+1)^{th}$ block not satisfying the size requirement including that a size of each of the n idle blocks is less than a calculated block size corresponding to the $(i+1)^{th}$ block.

In some embodiments, the obtaining module 701 is further configured to:

use the $(i+1)^{th}$ block as one of the m allocated blocks in response to the $(i+1)^{th}$ block obtained by the traversal being an allocated block and the $(i+1)^{th}$ block satisfying the size requirement, the $(i+1)^{th}$ block satisfying the size requirement including that the n idle blocks include an idle block having a size not less than a calculated block size corresponding to the $(i+1)^{th}$ block.

Figure 8:
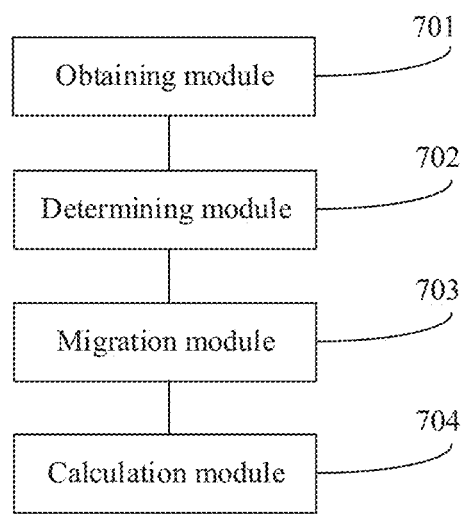
FIG. 8 is a schematic structural diagram of a memory defragmentation apparatus according to an exemplary embodiment of this application.

In some embodiments, as shown in FIG. 8, the apparatus further includes:

a calculation module 704, configured to accumulate, when a $j^{th}$ block obtained by the traversal is an allocated block, a size of the $j^{th}$ block to an existing calculated block size, to obtain a calculated block size corresponding to the $j^{th}$ block, the existing calculated block size being determined based on a sum of sizes of all allocated blocks obtained by the traversal before the $j^{th}$ block, and j being a positive integer.

In some embodiments, the determining module 702 is further configured to determine a candidate idle block having a size not less than the calculated block size corresponding to the $i^{th}$ block in the n idle blocks in response to the $i^{th}$ block satisfying the size requirement, that the n idle blocks include an idle block having a size not less than a calculated block size corresponding to the $(i+1)^{th}$ block including that the size of the candidate idle block is not less than the calculated block size corresponding to the $(i+1)^{th}$ block or idle blocks among the n idle blocks other than the candidate idle block include an idle block having a size not less than the calculated block size corresponding to the $(i+1)^{th}$ block.

In some embodiments, a position and a size of each of the n idle blocks in the memory are stored in a red-black tree data structure. The determining module 702 is configured to:

determine, in the n idle blocks, a target idle block having a size which is the smallest but is greater than the size of the allocated block among the tail non-idle blocks through the red-black tree.

Figure 9:
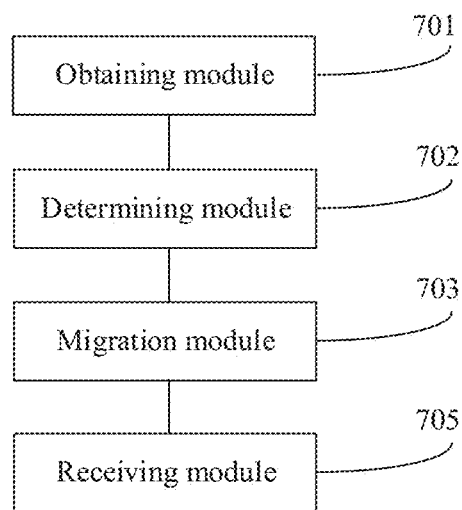
FIG. 9 is a schematic structural diagram of a memory defragmentation apparatus according to an exemplary embodiment of this application.

In some embodiments, as shown in FIG. 9, the apparatus further includes:

a receiving module 705, configured to receive a memory defragmentation instruction, the memory defragmentation instruction including a defragmentation size, the defragmentation size being configured for indicating a size of memory fragments to be sorted in processing of an image data frame, the obtaining module 701 being configured to obtain the n idle blocks before the tail idle block in the memory in the processing of the image data frame in response to a size of the allocated block which is sorted being less than the defragmentation size.

In some embodiments, the determining module 702 is further configured to determine that the defragmentation of the memory is completed in response to the size of the allocated block which is sorted being not less than the defragmentation size.

In some embodiments, the memory fragments exist in a memory of a GPU.

The memory defragmentation apparatus provided in the foregoing embodiments is merely exemplified by using division of the foregoing functional modules. In a practical application, the foregoing functions may be allocated to and completed by different functional modules as required. In other words, an internal structure of the device is divided into different functional modules, to complete all or some of the functions described above. In addition, the memory defragmentation apparatus provided in the foregoing embodiment has the same idea as the memory defragmentation method. For a specific implementation thereof, reference is made to the method embodiment. Details are not described herein.

An embodiment of this application further provides a computer device. The computer device includes a processor and a memory, the memory having at least one program stored therein, the at least one program being loaded and executed by the processor to cause the computer device to implement the memory defragmentation method provided in the foregoing method embodiments.

Figure 10:
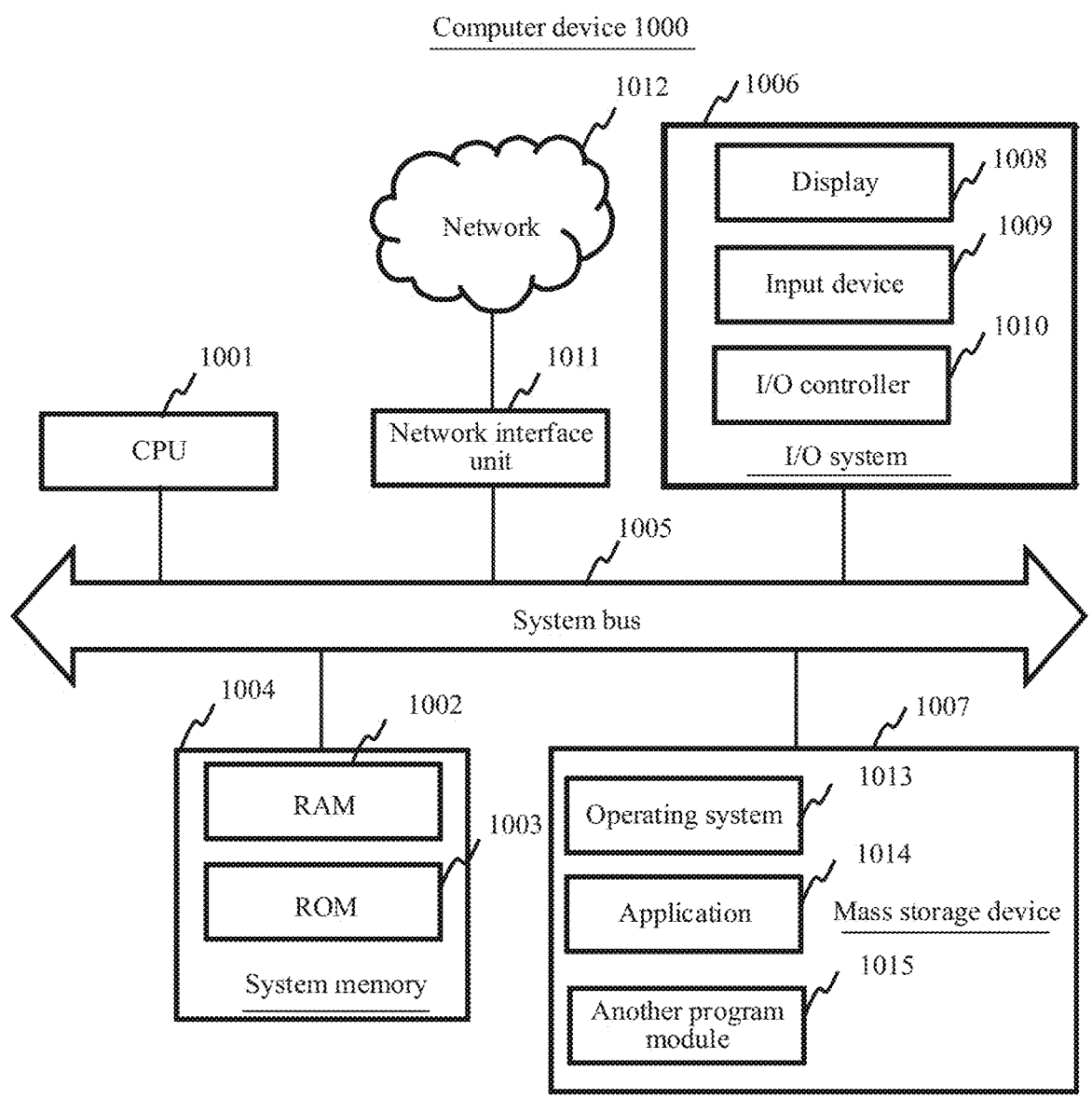
FIG. 10 is a schematic structural diagram of a computer device according to an exemplary embodiment of this application.

In some embodiments, the computer device is a server. Exemplarily, FIG. 10 is a schematic structural diagram of a computer device according to an exemplary embodiment of this application.

The computer device 1000 includes a central processing unit (CPU) 1001, a system memory 1004 including a RAM 1002 and a ROM 1003, and a system bus 1005 connected to the system memory 1004 to the CPU 1001. The computer device 1000 further includes a basic input/output (I/O) system 1006 assisting in information transmission between components in the computer device, and a mass storage device 1007 configured to store an operating system 1013, an application 1014, and another program module 1015.

The basic I/O system 1006 includes a display 1008 configured to display information and an input device 1009 configured for a user to input information, such as a mouse and a keyboard. The display 1008 and the input device 1009 are both connected to the CPU 1001 by using an I/O controller 1010 connected to the system bus 1005. The basic I/O system 1006 may further include the I/O controller 1010 to receive and process inputs from a plurality of other devices such as a keyboard, a mouse, or an electronic stylus. Similarly, the I/O controller 1010 further provides an output to a display screen, a printer, or another type of output device.

The mass storage device 1007 is connected to the CPU 1001 by using a mass storage controller (not shown) connected to the system bus 1005. The mass storage device 1007 and a computer-readable storage medium associated with the mass storage device provide non-transitory storage for the computer device 1000. In other words, the mass storage device 1007 may include a computer-readable storage medium (not shown) such as a hard disk or a compact disc read-only memory (CD-ROM) drive.

Without loss of generality, the computer-readable storage medium may include a computer storage medium and a communication medium. The computer storage medium includes volatile and non-transitory media, and removable and non-removable media implemented by using any method or technology configured for storing information such as computer-readable storage instructions, data structures, program modules, or other data. The computer storage medium includes a RAM, a ROM, an erasable programmable read-only memory (EPROM), an electrically erasable programmable read-only memory (EEPROM), a flash memory or another solid-state storage device, a CD-ROM, a digital versatile disc (DVD) or another optical storage, a cartridge, a magnetic tape, a magnetic disk memory, or another magnetic storage device. Certainly, a person skilled in the art may learn that the computer storage medium is not limited to the foregoing types. The foregoing system memory 1004 and mass storage device 1007 may be collectively referred to as a memory.

The memory has one or more programs stored therein, the one or more programs being configured to be executed by the one or more CPUs 1001, and the one or more programs include instructions configured for implementing the foregoing method embodiments. The CPUs 1001 execute the one or more programs to cause the computer device 1000 to implement the memory defragmentation method provided in the foregoing method embodiments.

In the embodiments of this application, the computer device 1000 may be further connected to a remote computer device on a network for running through a network such as the Internet. In other words, the computer device 1000 may be connected to a network 1012 through a network interface unit 1011 connected to the system bus 1005, or may be connected to another type of network or remote computer device system (not shown) through the network interface unit 1011.

The memory further includes one or more programs, the one or more programs being stored in the memory and including operations to be performed by the computer device in the memory defragmentation method provided in the embodiments of this application.

An embodiment of this application further provides a non-transitory computer-readable storage medium, having at least one program stored therein, the at least one program, when loaded and executed by a processor of a computer device, causing the computer device to implement the memory defragmentation method provided in the foregoing method embodiments.

This application further provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the memory defragmentation method provided in the foregoing method embodiments.

A person of ordinary skill in the art may understand that all or some of the operations of the foregoing embodiments may be implemented by hardware, or may be implemented by a program instructing relevant hardware. The program may be stored in a computer-readable storage medium. The readable storage medium may be a ROM, a magnetic disk, an optical disc, or the like.

The above descriptions are merely embodiments of this application, and are not intended to limit this application. Any modification, equivalent replacement, improvement, or the like made within the principle of this application falls within the protection scope of this application.

What is claimed is:

1. A memory defragmentation method performed by a computer device, the method comprising:
   obtaining n idle blocks before a tail idle block in a memory of a graphic processing unit (GPU), the tail idle block being located at a head of remaining unallocated idle blocks in the memory, and n being a positive integer;
   obtaining tail non-idle blocks in the memory, the tail non-idle blocks comprising one allocated block or a plurality of continuous allocated blocks immediately before the tail idle block in the memory;
   determining one or more target idle blocks in the n idle blocks, a size of the target idle block being not less than a size of the allocated blocks among the tail non-idle blocks;
   migrating data in the tail non-idle blocks to the target idle blocks; and
   updating the head of remaining unallocated idle blocks in the memory by releasing the tail non-idle blocks.

2. The method according to claim 1, wherein the obtaining tail non-idle blocks in the memory comprises:
   obtaining m continuous allocated blocks from the tail idle block to a head of the memory, m being a positive integer; and
   the determining one or more target idle blocks in the n idle blocks comprises:
   determining, in the n idle blocks, one or more target idle blocks having a size not less than a size of the m allocated blocks.

3. The method according to claim 2, wherein the obtaining m continuous allocated blocks from the tail idle block to a head of the memory comprises:
   traversing blocks in the memory from a previous block of the tail idle block to the head of the memory;
   using, when an $i^{th}$ block obtained by the traversal is an allocated block and the $i^{th}$ block satisfies a size requirement in response to an $(i+1)^{th}$ block obtained by the traversal being an allocated block and the $(i+1)^{th}$ block not satisfying the size requirement or in response to the $(i+1)^{th}$ block obtained by the traversal being an idle block, each allocated block traversed before the $(i+1)^{th}$ block as the m allocated blocks, the m allocated blocks comprising the $i^{th}$ block, and i being a positive integer;
   that the $i^{th}$ block satisfies a size requirement comprising that the n idle blocks comprise an idle block having a size not less than a calculated block size corresponding to the $i^{th}$ block, and the $(i+1)^{th}$ block not satisfying the size requirement comprising that a size of each of the n idle blocks is less than a calculated block size corresponding to the $(i+1)^{th}$ block.

4. The method according to claim 3, further comprising:
   using the $(i+1)^{th}$ block as one of the m allocated blocks in response to the $(i+1)^{th}$ block obtained by the traversal being an allocated block and the $(i+1)^{th}$ block satisfying the size requirement,
   the $(i+1)^{th}$ block satisfying the size requirement comprising that the n idle blocks comprise an idle block having a size not less than a calculated block size corresponding to the $(i+1)^{th}$ block.

5. The method according to claim 3, further comprising:
   accumulating, when a $j^{th}$ block obtained by the traversal is an allocated block, a size of the $j^{th}$ block to an existing calculated block size, to obtain a calculated block size corresponding to the $j^{th}$ block,
   the existing calculated block size being determined based on a sum of sizes of all allocated blocks obtained by the traversal before the $j^{th}$ block, and j being a positive integer.

6. The method according to claim 4, further comprising:
   determining a candidate idle block having a size not less than the calculated block size corresponding to the $i^{th}$ block in the n idle blocks in response to the $i^{th}$ block satisfying the size requirement,
   that the n idle blocks comprise an idle block having a size not less than a calculated block size corresponding to the $(i+1)^{th}$ block comprising that the size of the candidate idle block is not less than the calculated block size corresponding to the $(i+1)^{th}$ block or idle blocks among the n idle blocks other than the candidate idle block comprise an idle block having a size not less than the calculated block size corresponding to the $(i+1)^{th}$ block.

7. The method according to claim 1, wherein a position and a size of each of the n idle blocks in the memory are stored in a red-black tree data structure; and the determining one or more target idle blocks in the n idle blocks comprises:

determining, in the n idle blocks, the one or more target idle blocks having a size greater than the size of the allocated block among the tail non-idle blocks through the red-black tree.

8. The method according to claim 1, further comprising:
receiving a memory defragmentation instruction, the memory defragmentation instruction comprising a defragmentation size, the defragmentation size being configured for indicating a size of memory fragments to be sorted in processing of an image data frame,
the obtaining n idle blocks before a tail idle block in a memory comprising:
obtaining the n idle blocks before the tail idle block in the memory in the processing of the image data frame by the GPU in response to a size of the allocated block which is sorted being less than the defragmentation size.

9. The method according to claim 8, further comprising:
determining that the sorting of the memory fragments is completed in response to the size of the allocated block which is sorted being not less than the defragmentation size.

10. A computer device, comprising a processor and a memory, the memory having at least one program stored therein, the at least one program, when loaded and executed by the processor, causing the computer device to implement a memory defragmentation method including:
obtaining n idle blocks before a tail idle block in a memory of a graphic processing unit (GPU), the tail idle block being located at a head of remaining unallocated idle blocks in the memory, and n being a positive integer;
obtaining tail non-idle blocks in the memory, the tail non-idle blocks comprising one allocated block or a plurality of continuous allocated blocks immediately before the tail idle block in the memory;
determining one or more target idle blocks in the n idle blocks, a size of the target idle block being not less than a size of the allocated blocks among the tail non-idle blocks;
migrating data in the tail non-idle blocks to the target idle blocks; and
updating the head of remaining unallocated idle blocks in the memory by releasing the tail non-idle blocks.

11. The computer device according to claim 10, wherein the obtaining tail non-idle blocks in the memory comprises:
obtaining m continuous allocated blocks from the tail idle block to a head of the memory, m being a positive integer; and
the determining one or more target idle blocks in the n idle blocks comprises:
determining, in the n idle blocks, one or more target idle blocks having a size not less than a size of the m allocated blocks.

12. The computer device according to claim 11, wherein the obtaining m continuous allocated blocks from the tail idle block to a head of the memory comprises:
traversing blocks in the memory from a previous block of the tail idle block to the head of the memory;
using, when an $i^{th}$ block obtained by the traversal is an allocated block and the $i^{th}$ block satisfies a size requirement in response to an $(i+1)^{th}$ block obtained by the traversal being an allocated block and the $(i+1)^{th}$ block not satisfying the size requirement or in response to the $(i+1)^{th}$ block obtained by the traversal being an idle block, each allocated block traversed before the $(i+1)^{th}$ block as the m allocated blocks, the m allocated blocks comprising the $i^{th}$ block, and i being a positive integer;
that the $i^{th}$ block satisfies a size requirement comprising that the n idle blocks comprise an idle block having a size not less than a calculated block size corresponding to the $i^{th}$ block, and the $(i+1)^{th}$ block not satisfying the size requirement comprising that a size of each of the n idle blocks is less than a calculated block size corresponding to the $(i+1)^{th}$ block.

13. The computer device according to claim 12, wherein the method further comprises:
using the $(i+1)^{th}$ block as one of the m allocated blocks in response to the $(i+1)^{th}$ block obtained by the traversal being an allocated block and the $(i+1)^{th}$ block satisfying the size requirement,
the $(i+1)^{th}$ block satisfying the size requirement comprising that the n idle blocks comprise an idle block having a size not less than a calculated block size corresponding to the $(i+1)^{th}$ block.

14. The computer device according to claim 12, wherein the method further comprises:
accumulating, when a $j^{th}$ block obtained by the traversal is an allocated block, a size of the $j^{th}$ block to an existing calculated block size, to obtain a calculated block size corresponding to the $j^{th}$ block,
the existing calculated block size being determined based on a sum of sizes of all allocated blocks obtained by the traversal before the $j^{th}$ block, and j being a positive integer.

15. The computer device according to claim 13, wherein the method further comprises:
determining a candidate idle block having a size not less than the calculated block size corresponding to the $i^{th}$ block in the n idle blocks in response to the $i^{th}$ block satisfying the size requirement,
that the n idle blocks comprise an idle block having a size not less than a calculated block size corresponding to the $(i+1)^{th}$ block comprising that the size of the candidate idle block is not less than the calculated block size corresponding to the $(i+1)^{th}$ block or idle blocks among the n idle blocks other than the candidate idle block comprise an idle block having a size not less than the calculated block size corresponding to the $(i+1)^{th}$ block.

16. The computer device according to claim 10, wherein a position and a size of each of the n idle blocks in the memory are stored in a red-black tree data structure; and the determining one or more target idle blocks in the n idle blocks comprises:
determining, in the n idle blocks, the one or more target idle blocks having a size greater than the size of the allocated block among the tail non-idle blocks through the red-black tree.

17. The computer device according to claim 10, wherein the method further comprises:
receiving a memory defragmentation instruction, the memory defragmentation instruction comprising a defragmentation size, the defragmentation size being configured for indicating a size of memory fragments to be sorted in processing of an image data frame,
the obtaining n idle blocks before a tail idle block in a memory comprising:
obtaining the n idle blocks before the tail idle block in the memory in the processing of the image data frame by the GPU in response to a size of the allocated block which is sorted being less than the defragmentation size.

18. The computer device according to claim 17, wherein the method further comprises:
- determining that the sorting of the memory fragments is completed in response to the size of the allocated block which is sorted being not less than the defragmentation size.

19. A non-transitory computer-readable storage medium, having at least one program stored therein, the at least one program, when loaded and executed by a processor of a computer device, causing the computer device to implement a memory defragmentation method including:
- obtaining n idle blocks before a tail idle block in a memory of a graphic processing unit (GPU), the tail idle block being located at a head of remaining unallocated idle blocks in the memory, and n being a positive integer;
- obtaining tail non-idle blocks in the memory, the tail non-idle blocks comprising one allocated block or a plurality of continuous allocated blocks immediately before the tail idle block in the memory;
- determining one or more target idle blocks in the n idle blocks, a size of the target idle block being not less than a size of the allocated blocks among the tail non-idle blocks;
- migrating data in the tail non-idle blocks to the target idle blocks; and
- updating the head of remaining unallocated idle blocks in the memory by releasing the tail non-idle blocks.

20. The non-transitory computer-readable storage medium according to claim 19, wherein the method further comprises:
- receiving a memory defragmentation instruction, the memory defragmentation instruction comprising a defragmentation size, the defragmentation size being configured for indicating a size of memory fragments to be sorted in processing of an image data frame,
- the obtaining n idle blocks before a tail idle block in a memory comprising:
- obtaining the n idle blocks before the tail idle block in the memory in the processing of the image data frame by the GPU in response to a size of the allocated block which is sorted being less than the defragmentation size.

* * * * *